Aug. 9, 1949.  C. M. SAVRDA  2,478,713
FISH FILLETING MACHINE
Filed June 14, 1944  5 Sheets-Sheet 1

INVENTOR.
CHARLES M. SAVRDA
BY Wm. S. Pritchard
ATTORNEY.

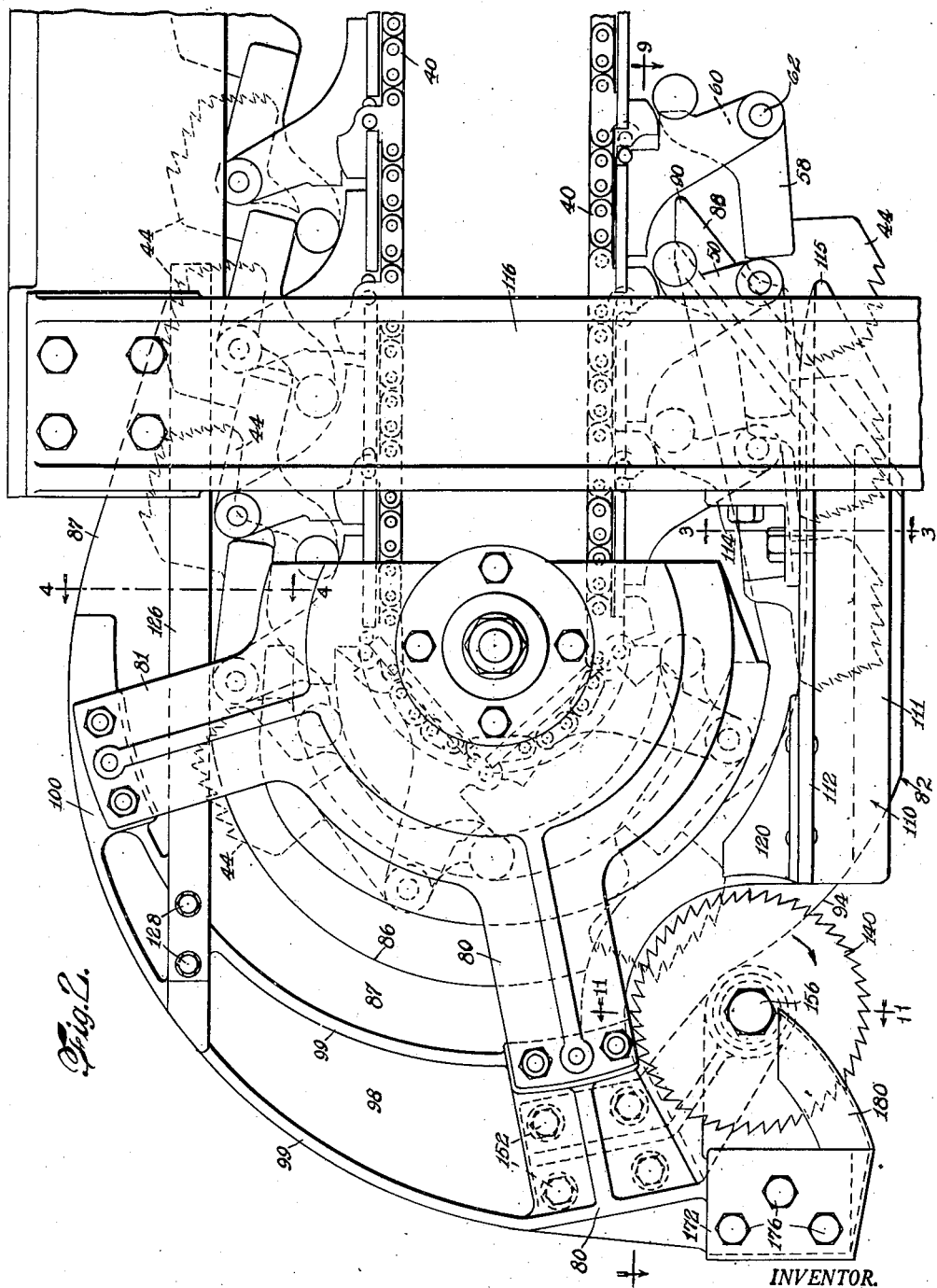

Aug. 9, 1949.　　　　C. M. SAVRDA　　　　2,478,713
FISH FILLETING MACHINE
Filed June 14, 1944　　　　　　　　　　　5 Sheets-Sheet 3
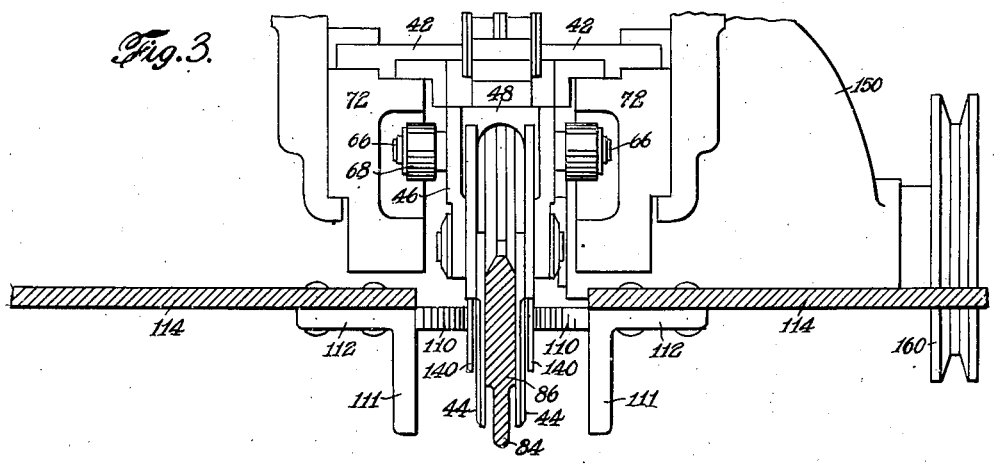
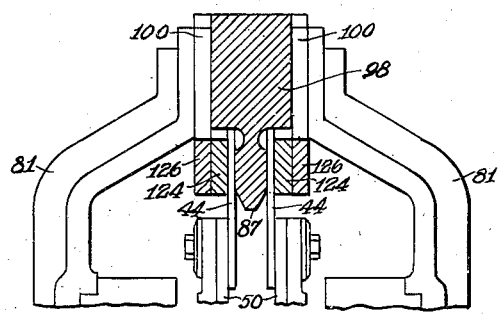
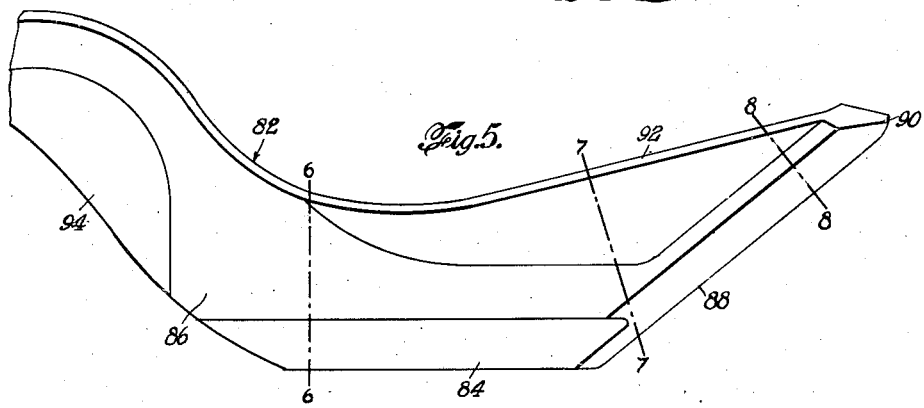
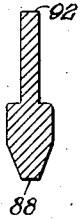
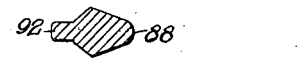
INVENTOR.
CHARLES M. SAVRDA
BY Wm. S. Pritchard
ATTORNEY.

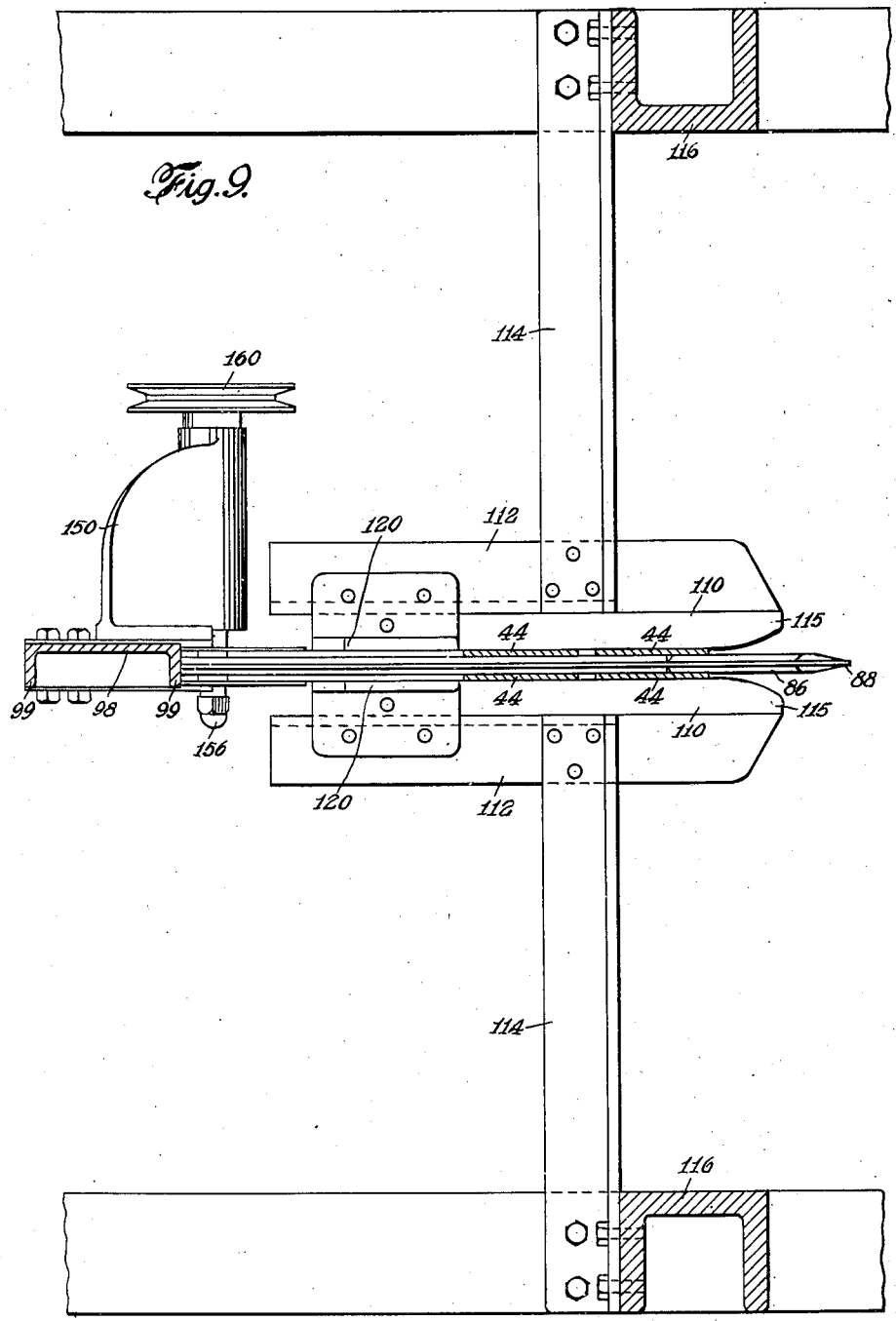

Aug. 9, 1949.　　　　C. M. SAVRDA　　　　2,478,713
FISH FILLETING MACHINE
Filed June 14, 1944　　　　　　　　　　　　5 Sheets-Sheet 5
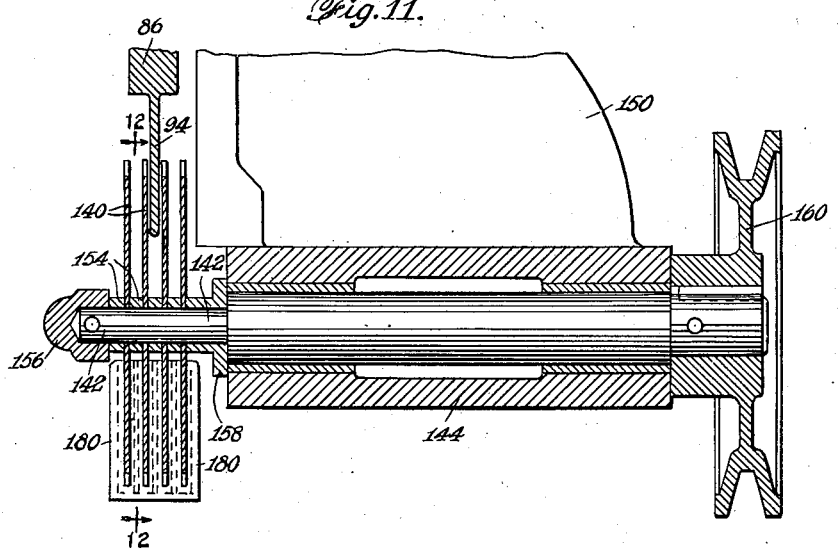
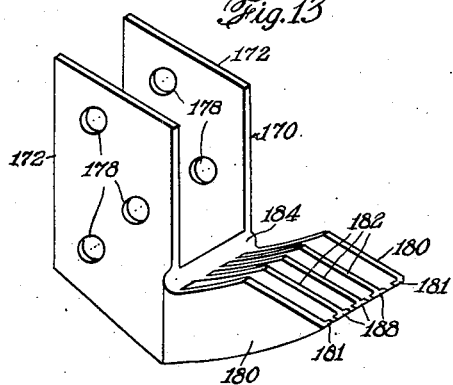
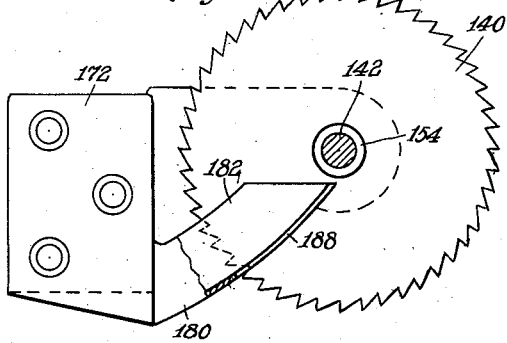
INVENTOR.
CHARLES M. SAVRDA
BY　Wm. S. Pritchard
ATTORNEY.

Patented Aug. 9, 1949

2,478,713

UNITED STATES PATENT OFFICE 2,478,713

FISH FILLETING MACHINE

Charles M. Savrda, Bay Shore, N. Y., assignor, by mesne assignments, to Fish Machinery Corporation, Boston, Mass., a corporation of Delaware Application June 14, 1944, Serial No. 540,323

10 Claims. (Cl. 17—4)

This invention relates to filleting machines, and more particularly to means for insuring the removal of the skeleton of a fish and to prevent distortion of the pusher fingers of a feeding conveyer which feeds and maintains the fish in contact with the ribbing knives.

As described in United States Patent 2,149,021, after a fish, tail leading and back downward, has been slit its entire length upwardly through the back thereof almost to the backbone and the belly side slit by parallel incisions, each fillet remains attached to the backbone of the fish along its lateral sides by a small ribbon of meat. The fillets are further attached to the ribs of the fish. In this condition, the fish is propelled with sufficient force onto a pair of spaced ribbing knives. The two ribbons of meat adhering to the backbone are severed by the severing portion of the knives so that the fillets remain attached only at the ribs of the fish. The backbone, being freed of the support supplied by the meat, tends to arc downwardly as it passes along the ribbing knives. The ribbing knives engage and scrape along each of the fish in spite of their angular variations to remove the fillets therefrom.

As also shown in Patent 2,149,021, there is provided means for conveying and simultaneously holding the fish down on the ribbing knives so that the fillets can be removed from the ribs. This means, called a "ribbing conveyer," comprises a pair of endless chains having a series of supporting plates secured thereto in spaced relationship. Each supporting plate is secured at approximately the middle thereof to the chains and journals a lever comprising an arm which, when carried along the lower flight of the chains, faces downwardly and rearwardly, terminating along its under side in a series of teeth. The other arm extends through the supporting plate so as to project above the chains. The levers are arranged in staggered relationship with each other and are laterally offset so that they can pass on either side of the spikes extending toward the belly of the fish from its backbone.

United States Patent 2,397,158 discloses a ribbing conveyer comprising a chain secured at the ends of blocks whereby a minimum throw is imparted to each block as it passes around the sprockets in travelling from the upper to the lower flights, and vice versa. The blocks are also so constructed that when in a horizontal plane the adjacent blocks cooperate with each other to form a substantially rigid structure. Each of the blocks is provided with a pair of oppositely disposed and laterally spaced supports.

A holder is rotatably mounted on the inner surface of each support. Each holder, which is in the form of a lever, carries at the upper end thereof a cam roller which is adapted to cooperate with cams to raise and lower the holder. At the other end, each holder is provided with a pusher finger having teeth so shaped that each pair of fingers will engage the fish on opposite sides of the backbone with a forward thrust.

In each of the aforementioned ribbing conveyers, frequently at the discharge end the pusher fingers do not disengage themselves from the skeleton, whereby the skeleton adheres thereto even when the ribbing conveyer passes from the lower to the upper flight. Frequently also, the pusher fingers are deformed and distorted by the wedging action of the skeleton or a portion thereof. In some instances, the fingers are bent inwardly toward each other, with the result that the fingers will thereafter not properly engage the fish for the feeding thereof over the ribbing knives.

An object of this invention is to provide means adjacent the discharge end of a ribbing conveyer to release the skeleton from the pusher fingers.

Another object of this invention is to provide means to remove the skeleton or any portion thereof which adheres to the pusher fingers.

A further object of this invention is to provide means adjacent the discharge end of the ribbing conveyer which maintains the pusher fingers in proper spaced relationship with respect to each other and thereby prevents deformation and distortion thereof.

A specific object of this invention is to provide stripper means to disengage the skeleton from the pusher fingers, said stripper means being so constructed as to maintain the fingers in proper laterally spaced relationship with respect to each other.

A further specific object of this invention is to provide means to remove any portion of the fish (skeleton, tail, bones, etc.) which has not been removed from the pusher fingers by the stripper means.

Other objects will become apparent hereinafter.

The above objects are accomplished, in general, by providing adjacent the discharge end of the ribbing conveyer a stripper having means adapted to engage and push downwardly the skeleton engaged by the pusher fingers. The stripper is stationary and positioned intermediate the ribbing knives so that it will extend between the pusher fingers as the latter are conveyed by the ribbing conveyer to the discharge end thereof. The stripper is also so constructed that the sides thereof serve to guide and maintain the pusher fingers in proper laterally spaced position relative to each other not only during the period when it is effective to remove the skeleton but preferably also until the ribbing conveyer passes around the sprocket during the travel of the ribbing conveyer from the lower operative flight to the upper inoperative flight. The stripper is provided with a nose substantially triangular in cross-section and inclined downwardly so that it will gradually pass between the pusher fingers as the latter are conveyed thereto and present them in proper position to the portion of the stripper which maintains the fingers in properly spaced lateral position. The stripper, by maintaining the fingers in lateral spaced relationship, also prevents the fingers from being forced inwardly toward each other. Means are also provided which cooperate with the stripper and the pusher fingers to prevent the pusher fingers from being forced outwardly and away from each other. Means are also provided to prevent the distortion of the pusher fingers as the conveyer begins its upper flight. Sometimes, even though the skeleton is removed, a bone or portion of the tail adheres to or becomes wedged in the pusher fingers. Means, such as a plurality of spaced toothed members, are provided to remove any foreign material adhering to the pusher fingers. Means are also provided to clear the toothed members of any material which adheres thereto.

The details of the invention will become apparent from the drawings, wherein an illustrative embodiment of the invention is set forth and wherein:

Figure 2 is an enlarged side elevation of the discharge end of the apparatus shown in Figure 1;

Figure 3 is a section taken on the line 3—3 of Figure 2;

Figure 4 is a section taken on the line 4—4 of Figure 2;

Figure 5 is a perspective view of the forward portion of the stripper;

Figure 6 is a section taken on the line 6—6 of Figure 5;

Figure 7 is a section taken on the line 7—7 of Figure 5;

Figure 8 is a section taken on the line 8—8 of Figure 5;

Figure 9 is a section taken on the line 9—9 of Figure 2;

Figure 10 is a top plan view of the portion of the stripper adjacent the top flight;

Figure 11 is a section taken on the line 11—11 of Figure 2;

Figure 12 is a section taken on the line 12—12 of Figure 11; and

Figure 13 is a perspective view of the means for removing any foreign material adhering to the toothed members.

Figure 1:
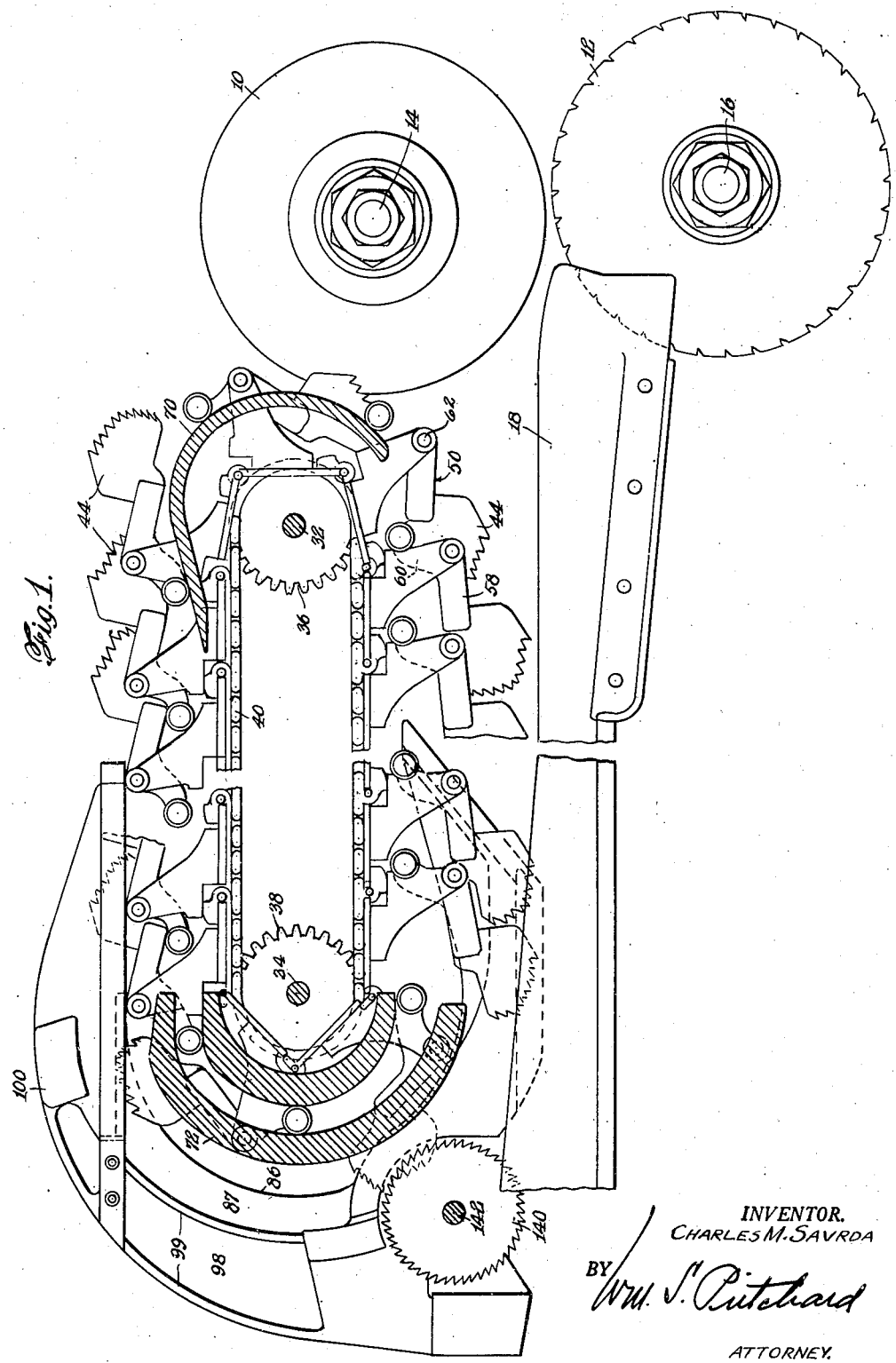
Figure 1 is a side elevation, partly in section, of an apparatus including a ribbing conveyer and ribbing knives together with the stripper and appurtenant devices.

For convenience, this invention will be described in connection with the ribbing conveyer shown and described in United States Patent 2,397,158. Since the ribbing conveyer is completely described in said patent, only so much thereof will herein be described as is necessary for an understanding of the invention.

Referring now to the drawings wherein like reference numerals designate like parts, the reference numeral 10 designates one (the other not being shown) of a pair of rotary belly-cutting knives which are adapted to make incisions in the belly side of a fish which is fed thereto, tail leading and back downward. The fish, prior to being incised by the rotary belly knives 10, has been slit through its entire length upwardly through the back almost to the back bone by any appropriate mechanism, such as that, for example, disclosed in United States Patent 2,149,021. During the belly-slitting operation, the fish is supported by a pair of rotary guide discs 12 which engage the fish at the backbone thereof. The rotary knives 10 and the rotary discs 12 are mounted on shafts 14 and 16 respectively, which are suitably carried on the frame and driven by a suitable means (not shown) to provide said rotary knives 10 and rotary discs 12 with the desired peripheral speed.

The knives 10 and the discs 12 are driven at the desired high rate of speed whereby the fish is caused to be fed therebetween and projected onto a pair of ribbing knives 18 appropriately positioned on supports carried by the frame. A deflector (not shown) aids in directing and positioning the fish on the ribbing knives 18 as it leaves the rotary knives 10 and rotary discs 12. The deflector is preferably of the type shown in United States Patent 2,424,057.

The ribbing knives 18 are preferably of the form, shape and construction shown in Figure 3 of United States Patent 2,149,021 and in United States Patent 2,179,821, although it is apparent that other ribbing knives may be used.

Disposed above the ribbing knives 18 is a pair of spaced shafts 32 and 34 which are mounted in bearings carried by the frame (not shown). The forward shaft 32 carries a sprocket 36, and the rear shaft 34 carries a sprocket 38. An endless chain 40 passes around the sprockets 36 and 38. The shaft 34 is driven in any convenient manner from a suitable source of power (not shown).

Blocks, generally designated by the reference numeral 42, are arranged in series and are secured at spaced intervals to the chain 40, as described in United States Patent 2,397,158. Each block carries a pair of laterally spaced pusher fingers, generally designated by the reference numeral 44, which are designed to enter the incisions on the belly side and engage the fish so that, as the chain travels through its lower flight, the pusher fingers will urge the fish downwardly and feed it over the ribbing knives 18. Each block 42 comprises a pair of substantially parallel, spaced, downwardly depending supports 46 secured together by a brace 48. Each pusher finger 44 is secured to a holder 50. Each holder 50 is in the form of a lever having a horizontal arm 58 and an upwardly curved arm 60. Each pusher finger holder 50 is rotatably mounted on a stud 62. It is to be noted that each pusher finger holder is mounted adjacent the inner surface of the adjacent support 46. In a hole adjacent the top end of the curved arm 60 of the pusher holder 50, there is rigidly secured one end of a stud shaft 66. This stud shaft extends outwardly, and adjacent its free end there is rotatably mounted a cam roller 68. Due to the manner in which the pusher finger holder 50 is mounted on its support 46, it is urged by gravity to move in a downward direction when the block is in a horizontal position.

Adjacent the feed end of the feed conveyor, there is provided a cam 70 which is adapted to cooperate with the cam rollers 68 as the pusher fingers are brought from the upper (inoperative) flight position to the lower (operative) flight position. At the discharge end, there is also provided a cam 72 which is adapted to cooperate with the cam rollers 68 as the conveyor 40 passes around the sprocket wheel 38 in travelling from the lower flight to the upper flight.

The cam 72 is carried on a casting (not shown) mounted in the machine. The casting is provided with a pair of arms 80 and 81 for reasons which will become apparent hereinafter.

The mechanism thus far specifically described is fully shown and described in United States Patent 2,397,158.

Adjacent the discharge end of the ribbing conveyer there is provided a stripper, generally designated by the reference numeral 82. As is disclosed in Figure 2, the stripper is positioned intermediate the ribbing knives 18 and is provided at the bottom thereof with a rib 84 which, as shown in Figure 3, extends below the bottom of the pusher fingers 44 and serves to urge the skeleton passing thereunder downwardly. The stripper 82 is also formed with a rail 86 which is adapted to extend between each pair of pusher fingers 44 as the latter are conveyed thereover. The pusher fingers 44 slide over the rail 86, or sufficient clearance therebetween is provided to permit the pusher fingers 44 to pass thereover. In either case, the rail 86 prevents said fingers from moving toward each other beyond the limit of the width of the rail 86 and thus maintains the pusher fingers in proper laterally spaced relationship.

In order that the pusher fingers 44 be properly spaced so that they can pass over the rail 86, the stripper 82 is provided with a separating nose 88 which, as shown in Figure 5, is substantially triangular in cross-section and is provided with a rounded front edge 90. The separating nose 88 extends upwardly from the front end of the rail 86 and is angularly disposed with respect to both the rib 84 and the rail 86. In the preferred form, the (interior) angle formed between the rail 86 and the separating nose 88 is obtuse. It is to be noted that the rail 86 at its forward end merges into the rear side of the nose 88 opposed thereto.

The nose 88 is made of a height so that the pusher fingers 44 will ride thereover before the pusher fingers begin to ride over the rail 86. In some instances, it is advantageous to have the height of the nose such that it will cooperate with the pusher finger holders 50. A rib 92 disposed between the rear of the nose 88 and the top of the rail 86 serves to reinforce the nose 88, and particularly that portion thereof which extends upwardly beyond the rail 86.

The rail 86 is provided with a rearwardly extending rib 94 which is secured on the arm 80 in any appropriate manner and whereby the stripper 82 is mounted in place.

The stripper 82 is preferably of such a length that the rib 84 thereof will engage the skeleton fed by the pusher fingers 44 before the pusher fingers 44 begin their travel around the sprocket 38, whereby, when the pusher fingers begin their travel around the sprocket, they will be effectively disengaged from the skeleton. The rail 86 of the stripper is of such dimensions that it will be engaged by the pusher fingers 44 while the latter are in operative engagement with the skeleton and while the chain 40 is still in its horizontal flight and also for a substantial distance after the fingers 44 have been released from the skeleton and the chain 40 has begun its travel around the sprocket 38.

In order to prevent movement of the pusher fingers 44 toward each other during the entire path of travel around the sprocket 38, the rail 86 is provided with an extension 87. The rail 87 is adapted to extend between the pusher fingers 44 and prevent said fingers from moving toward each other. As shown in Figure 2, the rail 87 is curved so that the pusher fingers 44 will be maintained in properly spaced lateral position during their entire travel around the sprocket 38 and indeed until the chain 40 has passed over the sprocket 38 and after it has begun its upper horizontal flight.

The rail 87 is formed integral with a casting 98, which is also provided with a pair of spaced ribs 99. The casting 98 is provided with a pad 100, to which is secured the arm 81 in any appropriate manner. The rail 87 is preferably made integral with the rail 86 of the stripper, and the entire structure is substantially horse-shoe in shape.

In order to prevent the pusher fingers 44 from moving away from each other during at least the period when they are riding over the rail 86 of the stripper 82, the latter is positioned intermediate a pair of guides 110. Each guide 110 comprises a vertical member 111 having at the top thereof a flange 112 extending outwardly therefrom. Each guide 110 is mounted in position by means of an angle 114, which has one leg thereof secured to an upright 116 of the machine and the other leg secured to the flange 112. The forward end of each guide 110 is tapered so that the entrance formed by the guides converges inwardly. The forward edge 115 of each guide 110 is angularly disposed with respect to the flange 112.

Each guide 110 has secured to the flange 112 adjacent the rear end thereof a supplemental guide 120 which is adapted to cooperate with the pusher fingers 44 as they begin their travel around the sprocket 38.

To prevent the pusher fingers 44 from moving outwardly as the chain 40 passes over the sprocket 38 and approaches the upper flight, the rail 87 is positioned intermediate a pair of guides 124. As shown in Figure 10, each guide 124 is secured to an arm 126 which is secured on the casting 98 by means of bolts 128. It is to be noted that each guide 124 is provided with an outwardly flared end 130.

The guides 124 also serve to maintain the pusher fingers 44 in proper laterally spaced relationship when for some reason it becomes necessary to reverse the direction of travel of the chain. In this case, the flared ends 130 serve to lead and guide the pusher fingers in proper position onto the rail 87.

Frequently, even though the skeleton has been effectively disengaged from the pusher fingers 44, a bone, a portion of the tail or some other foreign matter remains lodged between or adheres to some part of the pusher fingers 44. If such foreign matter is not removed, effective and efficient operation of the ribbing conveyer is not obtained. Thus, the instant invention contemplates means to effectively remove any such foreign matter which may adhere to the pusher fingers. In the form shown, such results are secured by a plurality of rotating circular toothed members 140. These toothed members 140 are secured onto a shaft 142 which is rotatably mounted in a journal bearing 144 carried on a bracket 150. The bracket 150 is secured onto the arm 80 in any appropriate manner, such as by bolts 152. The circular toothed members 140 are spaced from each other by means of collars 154 positioned on the shaft 142. A cap nut 156 secured on the end of the shaft 142 and a collar 158 positioned adjacent the journal bearing 144 secure the spacing collars 154 in position. The shaft 142 at the other end is provided with a pulley 160 which is driven by a belt actuated from any suitable source of power (not shown).

In the form shown, four toothed members 140 are shown, it, of course, being understood that a greater or lesser number may be used. In the form shown in Figures 2 and 11, it will be noted that the rib 84 extends between the two central circular toothed members 140 and that the rail 86 is of a shape to permit the toothed members to effect their desired function. The outer toothed members 140 are spaced from the central toothed members sufficiently to permit the respective pusher fingers 44 to pass therethrough. In normal operation, the circular toothed members 140 are driven in a direction opposite to the direction of travel of the pusher fingers cooperating therewith. Thus, any foreign matter which is carried by the pusher fingers 44 is removed by the circular toothed members 140. Sometimes the foreign matter is cut or severed by the teeth of the toothed members 140 in the removal thereof.

To prevent accumulation of foreign matter removed from the pusher fingers 44 on the circular toothed members 140, there is provided a clearer, which is generally designated by the reference numeral 170. As shown in Figure 13, the clearer 170 is provided with a pair of spaced supporting members 172. Bolts 176 extending through holes 178 secure the clearer to the frame of the machine.

Each of the supporting members 172 is provided at the bottom thereof with an integral, upwardly inclined and forwarding extending clearing member 180 which is adapted to extend on the exterior surface of the outer toothed members 140. Each member 180 is formed at its forward end with an inwardly extending flange 181 which terminates in close proximity to the toothed member adjacent thereto. Intermediate the members 180, there is provided a plurality of upwardly inclined and forwardly extending clearer elements 182 which are secured at the rear thereof to the cross-piece 184 carried by the side members 172. Each of the clearer elements 182 is adapted to extend in the space between two adjacent circular toothed members and is provided with a flange 188, each end of which is in close proximity or indeed in scraping relationship with the toothed member adjacent thereto. In position, the top edges of the clearing elements 180 and 182 lie in a horizontal plane, and the forward corners thereof in close proximity to the collars 154.

From the foregoing description, it is apparent that the instant invention provides an effective apparatus for positively permitting the pusher fingers to disengage themselves from the skeleton and maintaining the pusher fingers in proper laterally spaced relationship not only during the period when the pusher fingers are being disengaged from the skeleton, but also throughout their entire travel around the sprocket in passing from the lower to the upper flight. Additionally, the apparatus prevents distortion of the pusher fingers and provides means to remove any foreign material which might adhere thereto and interfere with efficient operation.

Since it is obvious that various changes and modifications may be made in the above description without departing from the nature or spirit thereof, this invention is not restricted thereto except as set forth in the appended claims.

I claim:

1. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer.

2. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer, said stripper having means to limit the inward lateral movement of the pusher fingers during travel over said stripper.

3. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer, said stripper having a rail which extends between and over which the pusher fingers are conveyed, said rail limiting the inward lateral movement of the respective pusher fingers passing thereover.

4. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer, said stripper having a rail which extends between and over which the pusher fingers are conveyed, said rail limiting the inward lateral movement of the respective pusher fingers passing thereover, said stripper having a separating nose to laterally space the pusher fingers in advance of said rail.

5. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer, said stripper having a rail which extends between and over which the pusher fingers are conveyed, said rail limiting the inward lateral movement of the respective pusher fingers passing thereover, said stripper having an upwardly extending inclined nose to separate the pusher fingers engaged thereby and guide them onto said rail.

6. In a fish filleting apparatus having a pair of spaced ribbing knives and a ribbing conveyor cooperating with said ribbing knives, said ribbing conveyor comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer, said stripper having a rail which extends between and over which the pusher fingers are conveyed, said rail limiting the inward lateral movement of the respective pusher fingers passing thereover, and means on each side of said rail to inhibit outward lateral movement of the pusher fingers as they pass over said rail.

7. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a stripper positioned adjacent the discharge end of the ribbing conveyer and centrally of the ribbing knives to engage and urge downwardly the skeleton of a fish fed therebeneath by said ribbing conveyer, said stripper having a rail which extends between and over which the pusher fingers are conveyed, said rail limiting the inward lateral movement of the respective pusher fingers passing thereover, said rail extending throughout the path of travel of the pusher fingers from the lower horizontal flight to the upper horizontal flight.

8. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a plurality of rotary circular toothed members positioned adjacent the discharge end of the ribbing conveyer and in the path of travel of said pusher fingers to remove foreign matter adhering to said pusher fingers.

9. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a plurality of spaced rotary circular toothed members positioned adjacent the discharge end of the ribbing conveyer and in the path of travel of said pusher fingers so that each pusher finger passes between two adjacent toothed members.

10. In a fish filleting apparatus having a pair of spaced ribbing knives and a ribbing conveyer cooperating with said ribbing knives, said ribbing conveyer comprising an endless chain, a sprocket at the discharge end to direct said chain in traveling from a horizontal lower to a horizontal upper flight and a plurality of pusher fingers carried by said chain, said pusher fingers being arranged in series in two laterally spaced rows to engage the spikes of the fish extending from the belly to the backbone and feed said fish over said ribbing knives, the combination of a plurality of spaced rotary circular toothed members positioned adjacent the discharge end of the ribbing conveyer and in the path of travel of said pusher fingers so that each pusher finger passes between two adjacent toothed members, and means to remove any foreign matter adhering to said toothed members.

CHARLES M. SAVRDA.

REFERENCES CITED

The following references are of record in the file of this patent:

UNITED STATES PATENTS

| Number | Name | Date |
|---|---|---|
| 2,149,021 | Hunt | Feb. 28, 1939 |
| 2,364,533 | Jackson | Dec. 5, 1944 |